United States Patent
Tenhunen et al.

(10) Patent No.: US 9,800,101 B2
(45) Date of Patent: Oct. 24, 2017

(54) AXIAL FLUX MOTOR INTENDED FOR FIXING TO A MACHINE AND METHOD FOR FIXING THE AXIAL FLUX MOTOR TO A MACHINE

(71) Applicants: Asmo Tenhunen, Hyvinkaa (FI); Jussi Huppunen, Lappeenranta (FI); Tuukka Korhonen, Tuusula (FI)

(72) Inventors: Asmo Tenhunen, Hyvinkaa (FI); Jussi Huppunen, Lappeenranta (FI); Tuukka Korhonen, Tuusula (FI)

(73) Assignee: Kone Corporation, Helsinki (FI)

( * ) Notice: Subject to any disclaimer, the term of this patent is extended or adjusted under 35 U.S.C. 154(b) by 148 days.

(21) Appl. No.: 14/634,437

(22) Filed: Feb. 27, 2015

(65) Prior Publication Data

US 2015/0171671 A1 Jun. 18, 2015

Related U.S. Application Data

(63) Continuation of application No. PCT/FI2013/050833, filed on Aug. 29, 2013.

(30) Foreign Application Priority Data

Sep. 5, 2012 (FI) .................................... 20125916

(51) Int. Cl.
*H02K 1/18* (2006.01)
*H02K 15/02* (2006.01)

(52) U.S. Cl.
CPC ............ *H02K 1/182* (2013.01); *H02K 15/02* (2013.01); *H02K 15/028* (2013.01); *Y10T 29/49009* (2015.01)

(58) Field of Classification Search
CPC ...... H02K 15/02; H02K 15/028; H02K 1/182; Y10T 29/49009

(Continued)

(56) References Cited

U.S. PATENT DOCUMENTS

| 4,512,442 A | 4/1985 | Moore et al. |
| 4,538,084 A * | 8/1985 | Kawada ................. H02K 1/185 310/216.055 |

(Continued)

FOREIGN PATENT DOCUMENTS

| EP | 1780160 A1 | 5/2007 |
| FI | 114419 B | 10/2004 |

(Continued)

OTHER PUBLICATIONS

Extended European Search Report dated Apr. 1, 2016 issued in corresponding European Application No. 13835306.5.

(Continued)

*Primary Examiner* — Alex W Mok

(74) *Attorney, Agent, or Firm* — Harness, Dickey & Pierce, P.L.C.

(57) ABSTRACT

An axial flux motor intended for fixing to a machine comprises a stator stack as well as a rotor installed to rotate with respect to the stator stack, which rotor determines the axis of rotation. The stator stack comprises sectional slots on the side intersecting the axis of rotation, preferably the sectional slots include radial sectional slots or are radial sectional slots and/or there are 6-12 of them. Into each respective sectional slot a fixing part can be installed, which at least in the direction of the axis of rotation shape-locks into the sectional slot in question. The axial flux motor can be fixed to the machine by fixing at least some of the fixing parts to the machine.

13 Claims, 2 Drawing Sheets

(58) Field of Classification Search
USPC .............................................. 310/91; 29/596
See application file for complete search history.

(56) References Cited

U.S. PATENT DOCUMENTS

| | | |
|---|---|---|
| 5,578,801 A | 11/1996 | Hofmann |
| 5,811,906 A | 9/1998 | Hakala et al. |
| 6,325,179 B1 | 12/2001 | Barreiro et al. |
| 6,581,270 B1 * | 6/2003 | Aulanko ................ H02K 3/493 242/432 |
| 6,956,309 B2 | 10/2005 | Aulanko et al. |
| 8,421,301 B2 | 4/2013 | Hsu et al. |
| 2005/0023926 A1 | 2/2005 | Aulanko et al. |
| 2007/0000735 A1 | 1/2007 | Hanninen |
| 2011/0198167 A1 | 8/2011 | Huppunen et al. |
| 2011/0260566 A1 | 10/2011 | Odvarka et al. |
| 2012/0086303 A1 | 4/2012 | Hsu et al. |
| 2012/0175996 A1 * | 7/2012 | Ikuta ..................... H02K 1/148 310/216.134 |

FOREIGN PATENT DOCUMENTS

| | | |
|---|---|---|
| WO | WO-00/20320 A1 | 4/2000 |
| WO | WO-2005/066057 A2 | 7/2005 |
| WO | WO-2010/061049 A1 | 6/2010 |
| WO | WO-2010/061200 A2 | 6/2010 |

OTHER PUBLICATIONS

International Search Report for PCT/FI2012/050957 dated Dec. 11, 2012.
Written Opinion for PCT/FI2012/050957 dated Dec. 11, 2012.
Finnish Search Report for FI20115983 dated Feb. 23, 2012.

* cited by examiner

AXIAL FLUX MOTOR INTENDED FOR FIXING TO A MACHINE AND METHOD FOR FIXING THE AXIAL FLUX MOTOR TO A MACHINE

This application is a continuation of PCT International Application No. PCT/FI2013/050833 which has an International filing date of Aug. 29, 2013, and which claims priority to Finnish patent application number 20125916 filed Sep. 5, 2012, the entire contents of both of which are incorporated herein by reference.

FIELD OF THE INVENTION

The present invention relates to electric motors and to the fixing of them to machines.

TECHNICAL BACKGROUND

Figure 1:
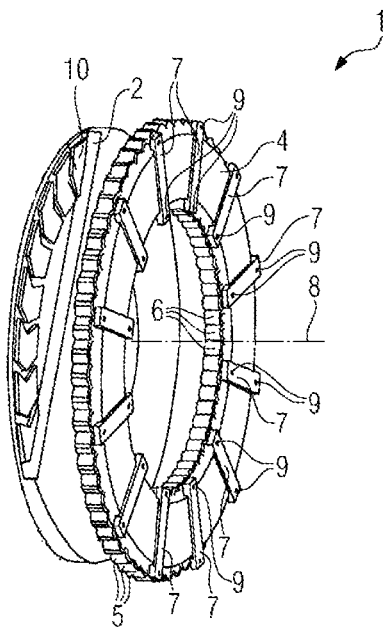

FIG. 1 presents a known axial flux motor 1. The axial flux motor 1 comprises a rotor 2 and a stator 4. The permanent magnets 10 in the rotor 2 are most preferably fixed to a fixing matrix. The permanent magnets 10 are disposed on the same rim in such a way that the polarities of two consecutive magnets are in the opposite direction to each other. The direction of the strength vector of the magnetic field formed by the permanent magnets is essentially in the direction of the axis of rotation 8 of the rotor 2.

With regard to the structure of the axial flux motor, more particularly the materials used in it, the stator teeth 5, 6 and the winding that, for the sake of clarity, is not presented in FIG. 1, we refer here to patent publication FI 114 419 B1. The axial flux motor described in the patent publication in question is fixed to the frame part of the machine by bolting. The bolting is implemented at the point of the holes 9 made in the fixing members 7. The fixing members 7 are before this fixed to the stator stack 4 by welding and by impregnating with resin.

AIM OF THE INVENTION

We have observed that welding fixing members to the stator causes thermal expansion and a partially returning deformation in the stator stack. When deformations return possibly only after resin impregnation, stresses and even microscopic tears are produced in the resin impregnation of the stator stack. This plays a part in the deterioration the stress resistance of the stator stack.

The aim of the invention is to prevent deterioration of the stress resistance of a machine fixing of an axial flux machine comprising a stator stack.

BRIEF DESCRIPTION OF THE INVENTION

The above aim can be resolved with the axial flux motor, as defined in the independent claim 1, to be fixed to a machine and with the method, as defined in the parallel independent claim 8, for fixing the axial flux motor to a machine.

The dependent claims describe preferred embodiments of the invention.

The axial flux motor intended for fixing to a machine comprises a stator stack as well as a rotor installed to rotate with respect to the stator stack, which rotor determines the axis of rotation. The stator stack comprises sectional slots on the side intersecting the axis of rotation, and into each respective sectional slot a fixing part can be installed, which at least in the direction of the axis of rotation shape-locks into the sectional slot in question. The axial flux motor can in this case be fixed to the machine by fixing at least some of the fixing parts to the machine.

In the method for fixing the axial flux motor to a machine sectional slots are made in the stator stack of the axial flux motor, in the side intersecting the axis of rotation of the rotor of the axial flux motor. After this a fixing part is installed into each respective sectional slot, which fixing part shape-locks into the sectional slot in question at least in the direction of the axis of rotation. Then the axial flux motor is fixed to the machine by fixing at least some of the fixing parts that are installed into their position to the machine.

Advantages of the Invention

The axial flux motor can be fixed to the machine explicitly by means of the sectional slots. In the method described above the axial flux motor is fixed to the machine explicitly by means of the sectional slots.

According to a preferred embodiment the sectional slots are implemented radially. Preferably there are 6-12 sectional slots in each stator.

When sectional slots and fixing members to be disposed therein are used for the fixing instead of fixing members to be welded on top of the stator stack, the partially returning deformation resulting from welding and the problems occurring as a result of their returning after resin impregnation can be better avoided. In this way a reduction in the stress resistance of possible resin impregnation of the stator stack can also be better avoided.

The first additional advantage enabled by the axial flux motor and by the method is that the machine fixing can be implemented more compactly compared to the solution presented in patent FI 114 419 B1, because the distance between the stator and the machine can be shortened. This results from the fact that separate fixing members to be welded on top of the stator stack are not needed because sectional slots and fixing members to be disposed therein are used for the fixing.

The second additional advantage enabled by the axial flux motor and by the method is that the heat generated in an axial flux motor can be conducted better into the frame part of the machine, and via it to the surrounding air, owing to the larger contact surface area enabling it. Compared to the solution presented in patent FI 114 419 B1, we can say that the advantage to be achieved results mainly from the fact that the compact structure enables better conducting of heat compared to a situation in which separate fixing members to be welded on top of the stator stack cause a distance between contact surfaces.

When the fixing parts to be used include the types of bars or comprise the types of bars having at least one fixing hole for a bolt fixing, the axial flux motor can be fixed to the machine explicitly via the bolt fixings of the bar.

When the fixing part to be used is bent at one or both of its ends, the fixing part can be fixed to the stator stack by bending. This reduces the need for welding and thus prevents deterioration of stress resistance caused by deformations resulting from the fixing.

When a fixing part can be welded at one or both of its ends to the stator stack, more particularly by full fusion welding (in German Verbindungsschweißung), it is possible to ensure that the machine fixing stays fixed.

When the sectional slots have been made, or are made, by die cutting, the sectional slots can be made together with fabrication of the stator in the same work phase or in a work phase to be implemented in connection with the fabrication.

When at least a part of the sectional slots are implemented or made to be of dovetail cross-sectional shape, the shape-locking slot shape of the stator stack can be implemented relatively simply with tools being used in the manufacture of radial flux machines according to the state of the art. In this way the number of devices needed in the manufacture of motors can be kept small.

When the axial flux motor according to the invention is fixed to a machine by the fixing parts, the machine can be driven by means of the axial flux motor and when driving the machine the operating problems resulting from the reduction in the stress resistance of the stator stack can be better avoided.

LIST OF FIGURES

Figure 2:
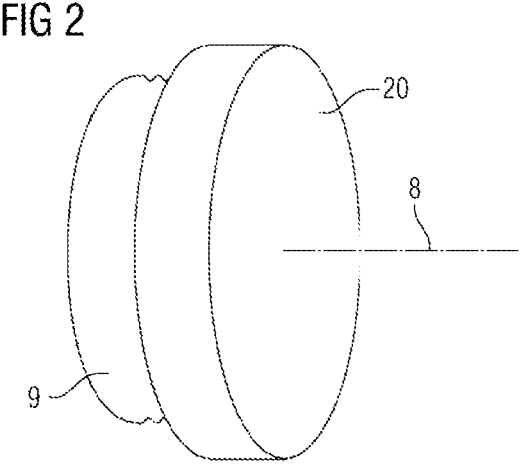
Figure 3:
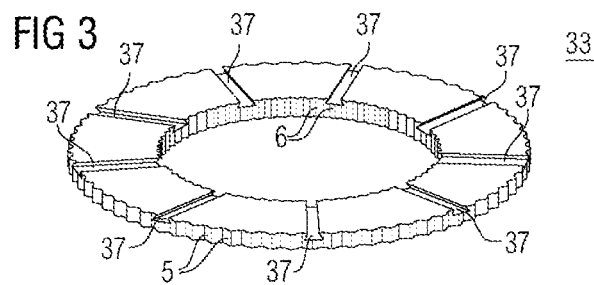
Figure 4:
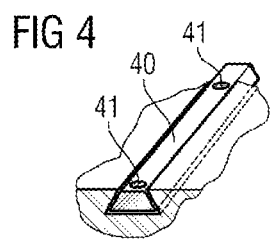
Figure 5:
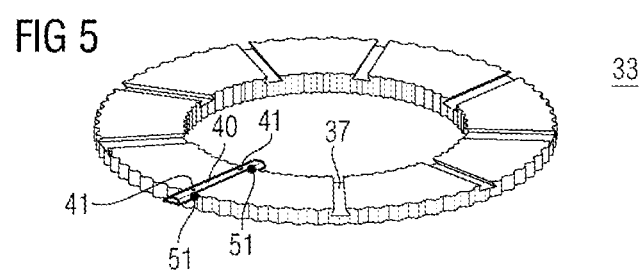
Figure 6:
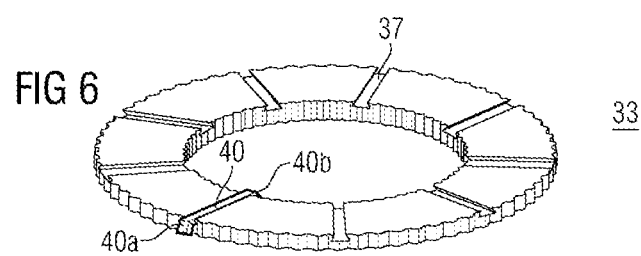

In the following the axial flux motor and the method are presented in more detail by referring to the embodiments described in FIGS. 3-6. The drawings present:

FIG. 1 the structure of a stator stack of an axial flux motor;

FIG. 2 the placement of a traction sheave of a hoisting machine of an elevator;

FIG. 3 a stator processed according to the invention, said stator comprising sectional slots;

FIG. 4 a bar used as a fixing member;

FIG. 5 a stator according to FIG. 3, in the sectional slots of which are bars of the type presented in FIG. 4, which bars are welded at the ends to the stator;

FIG. 6 a stator according to FIG. 3, in the sectional slots of which are bars of the type presented in FIG. 4, the ends of which bars are bent to the side.

The same reference numbers refer to the same technical features in all the FIGS.

DETAILED DESCRIPTION

In the MX machines manufactured by the applicant, for example, 6-12 units of metal fixing tags (fixing members 7) are welded to the stator stack 4, to be made from lamination plates, on the rear of each respective stator stack 4. These fixing tags are bolted to the frame of the machine and in this way the stator stack 4 can be attached to the frame of the machine. Although this way of implementing the machine fixing is indeed per se good, we have observed that it would be possible to improve it even more. The rotor 2 can be rotated by means of an electric current in relation to the stator 20/machine frame. The stator stack 4 of the stator 20 is attached to the machine frame, which in turn is fixed to an unmoving structure of the elevator system, such as to a guide rail or to a machine bedplate. The heat generated in welding the fixing tags causes deformations in the stator stack 4. Typically the stator stack 4 turns into a conical shape in which the inner rim of the stator stack 4 bulges outwards towards the rotor 2. When a conically-shaped stator stack 4 is wound and impregnated with resin and after that is bolted to the frame, the stator stack 4 tries to twist back to be straight, as a result of which stresses are produced in the resin impregnation, which stresses can cause microscopic tears in the resin impregnation. The consequence of this is a significant deterioration of the stress resistance of the stator stack 4.

The contact between the stator stack 4 and the frame is only at the point of the fixing tags. This area is only approx. 20% of the whole surface area of the rear of the stator stack 4. In this way the heat generated in the stator 20, which generally is 80-90% of the losses of the machine, is not able to transfer efficiently into the frame and via it to the surrounding air.

When the stator stack 4 is attached to the frame only at certain points, e.g. at regular intervals, it can easily happen that the stator 4 starts to vibrate and produce undesirable noise.

The fixing tags increase the axial length of the machine by 4-5 mm.

With the method presented in FIGS. 3-6 we have invented implementing the binding of the stator stack 33 from radial flux machines to the machine with bars known per se in the art, for which bars dovetail slots 37 are die cut in the rear of the stator stack 33 in connection with the die cutting of the grooves for the stator teeth 5, 6. The number of bars 40 is the same, or roughly the same, as the number of current fixing tags. Each respective bar 40 is pushed into a dovetail groove 37 and bent at the ends (cf FIG. 6) or welded at the ends (cf FIG. 5). In the method welding is not necessarily needed at all in the area of the rear of the stator stack 33, but of course welding can be used as an addition. Preferred welding points are marked in FIG. 5 with the reference number 51.

Threaded holes 41 are made in each bar 40 and the stator stack 33 is bolted to the frame at the bars 40. When done this way the thickness of the stator 20 does not increase at all and the contact surface of the stator stack 33 with respect to the frame increases twofold-threefold compared to the stator stack implemented using the structure presented in FIG. 1. The frame refers e.g. to the stator disc marked with the reference number in patent publication FI 114 419 B, which stator disc is attached or can be fixed to a stationary structure of the elevator system. These types of stationary structures are inter alia a machine bedplate and a guide rail.

At the same time the heat exchange and cooling of the machine are enhanced. The surface in touching contact between the stator stack 33 and the frame can in theory be up to 80% of the surface area of the rear of the stator stack. This enables better conducting of heat, which can be utilized when dimensioning and implementing the cooling needed by the stator stack 33 and the axial flux motor.

In addition, the stator stack 33 and the frame of the machine are more tightly together, in which case vibration of the stator 20 is damped better and an axial flux motor can in this way be implemented to be quieter than before.

The stator stack 33 described above is preferably impregnated with resin before the machine fixing. The mechanical stresses of the insulation structure (resin impregnation) of the stator stack 33 are significantly reduced, because the deformations caused by temperature differences of the stator stack 33 are either non-existent when the welding is omitted or reduced when the need for welding is reduced.

By means of the structure described above the axial dimension of the machine being produced can be reduced.

Described in other words, the underlying idea of the invention is that we implement the binding of a stator stack with fixing bars 40 to be generally used in radial flux machines. For this purpose bars dovetail slots 37 are die cut in the rear of the stator stack in connection with the die cutting of the grooves between the teeth 5, 6. The bar 40 is pushed into a dovetail groove 37 and bent at the ends 40a, 40b. Welding is not necessarily needed at all.

Threaded holes 41 are made in the bar 40 and the stator stack 33 is bolted to the machine from these threaded holes 41. In this way the thickness of the stator stack 33/stator 20 does not increase at all and the contact surface of the stator stack at the point of the machine fixing increases twofold or even threefold. The axial dimension of the machine is reduced, the heat exchange and cooling of the machine are enhanced, and the mechanical stresses on the insulation structure of the stator stack 33 are reduced.

The invention must not be regarded as being limited only to the claims below but instead should be understood to include all legal equivalents of said claims and combinations of the embodiments presented.

The rotor of an axial flux machine according to the invention is preferably fabricated from ferromagnetic material. Also a stator stack is preferably fabricated from lamination plates of ferromagnetic material.

The invention claimed is:

1. An axial flux motor comprising:
   a rotor configured to rotate such that the rotor determines an axis of rotation; and
   a stator stack including sectional slots on a side of the stator stack intersecting the axis of rotation, the sectional slots including between 6 and 12 radial sectional slots, the sectional slots configured to receive respective fixing parts installed therein, the fixing parts configured to shape-lock into a respective one of the sectional slots and the fixing parts including threaded holes therein such that the axial flux motor is configured to bolt to a machine via bolts inserted into the threaded holes of at least some of the fixing parts, wherein
      the sectional slots and the fixing parts are shaped such that, when the fixing parts are inserted into respective ones of the sectional slots, the fixing parts do not protrude from a surface of the stator stack having the sectional slots thereon.

2. The axial flux motor according to claim 1, wherein the fixing parts include bars, the bars each including at least one of the threaded holes configured to receive a respective one of the bolts.

3. The axial flux motor according to claim 1, wherein the fixing parts are bent at one or both of its ends.

4. The axial flux motor according to claim 1, wherein the fixing parts are weldable at one or both ends thereof to the stator stack.

5. The axial flux motor according to claim 1, wherein the sectional slots are made by die cutting.

6. The axial flux motor according to claim 1, wherein at least a part of the sectional slots has a dovetail cross-sectional shape.

7. The axial flux motor according to claim 1, wherein the axial flux motor is attached to the machine via the fixing parts.

8. A method of fixing an axial flux motor to a machine, the method comprising:
   forming sectional slots in a side of a stator stack of the axial flux motor, the side intersecting an axis of rotation of a rotor of the axial flux motor, the sectional slots including between 6 and 12 radial sectional slots;
   installing fixing parts in respective ones of the sectional slots, the fixing parts including threaded holes therein, the fixing parts configured to shape-lock into the respective ones of the sectional slots at least in the direction of the axis of rotation; and
   attaching the axial flux motor to the machine by bolting at least some of the fixing parts to the machine via bolts inserted into the threaded holes of at least some of the fixing parts, wherein
      the sectional slots and the fixing parts are shaped such that, when the installing installs the fixing parts into respective ones of the sectional slots, the fixing parts do not protrude from a surface of the stator stack having the sectional slots thereon.

9. The method according to claim 8, wherein the fixing parts include bars, the bars each including at least one of the threaded holes configured to receive a respective one of the bolts.

10. The method according to claim 8, wherein the fixing parts are bent at one or both of its ends.

11. The method according to claim 8, wherein the fixing parts are weldable at one or both ends to the stator stack.

12. The method according to claim 8, wherein the sectional slots are made by die cutting teeth of the stator.

13. The method according to claim 8, wherein at least a part of the sectional slots has a dovetail cross-sectional shape.

* * * * *